United States Patent Office 3,389,174
Patented June 18, 1968

3,389,174
STABLE TETRACYCLINE SOLUTIONS
Robert Arnold Nash, Spring Valley, and Bruce Edwin Haeger, Pomona, N.Y., assignors to American Cyanamid Company, Stamford, Conn., a corporation of Maine
No Drawing. Original application Oct. 4, 1962, Ser. No. 228,261, now Patent No. 3,219,529, dated Nov. 3, 1965. Divided and this application May 10, 1965, Ser. No. 454,720
6 Claims. (Cl. 260—559)

ABSTRACT OF THE DISCLOSURE

Stable solutions of neutral tetracycline antibiotics in substantially completely esterified lower alkyl esters of lower aliphatic polyhydroxy alcohols and lower aliphatic acids. Triacetin is the preferred glycerol ester and has been found useful in the preparation of stable solutions of tetracycline antibiotics useful for topical or other therapeutic uses.

---

This application is a division of our copending application Ser. No. 228,261, filed Oct. 4, 1962, now U.S. Patent No. 3,219,529.

This invention relates to stable antibiotic solutions of the tetracycline group. As used in the specification and claims the term "antibiotic solution" means a solution containing substantial amounts of antibiotic. Compositions containing small traces of antibiotic are not included.

In the past there has been a demand for solutions of tetracycline antibiotics which would be stable and which could be used for topical or other therapeutic uses. For the most part the solutions have been prepared by forming metal complexes with the tetracyclines. Stability has been achieved but in a number of cases the presence of metal ion complexes are not always desirable, and while they have been practically useful, there is still a need for stable, relatively non-toxic solutions of neutral tetracycline antibiotics. It is with the solution of this problem and with stable solutions that the present invention deals. It should be understood that in the present invention we are concerned with so called neutral tetracyclines, that is to say the amphoteric tetracyclines themselves, and not their salts with various acids or bases.

The requirements for satisfactory tetracycline antibiotic solutions require stability on storage at room temperatures, lack of toxicity and retention of the antibiotic activity. Reasonable compatibility with water is also a desirable characteristic as sometimes the solutions are utilized in aqueous media.

Basically, the present invention is concerned with stable solutions of neutral tetracycline antibiotics in esters of lower polyhydric alcohols with lower alkyl fatty acids. These esters should in general have no free hydroxyl groups. Among the best are the glycerol esters, such as triacetin. The corresponding triester of propionic acid can, of course, also be used, but as it shows no advantages over triacetin and is more expensive triacetin is the preferred member of the ester group.

The invention will be described in greater detail in conjunction with the following specific examples. In each case the solution is prepared with thorough stirring. It should be noted that the tetracycline antibiotic weights are in the neutral form, rather than the customary basis as the hydrochlorides. The pH values in the samples were measured potentiometrically using glass and saturated calomel electrodes.

Example 1

2.37 grams of neutral tetracycline are dissolved in 50 ml. of triacetin. The solution shows a bulk pH of 6.3 which decreases to 5.1 on 1:1 dilution in water. In time very small amounts of tetracycline precipitate, but not sufficient to significantly affect the composition. The solubilities of chlortetracycline, oxytetracycline, demethyltetracycline and demethylchlortetracycline are not quite as high. However, concentrations in the 10–40 mg./ml. range are obtainable, typical examples being shown in the following two examples.

Example 2

2.34 grams of demethyltetracycline are dissolved in 100 ml. of triacetin. The solution shows a bulk pH of 6.6 which decreases to 4.8 on 1:1 dilution with water.

Example 3

5.57 grams of chlortetracycline are dissolved in 100 ml. of triacetin producing a stable solution.

Example 4

Example 1 is repeated, replacing the 50 ml. of triacetin with the same amount of the triester of glycerol and propionic acid. A stable solution results but exhibits the same characteristics as with triacetin, namely there is a slight precipitation on prolonged storage.

Example 5

Example 1 is repeated, replacing the triacetin with an equal amount of ethyleneglycol diacetate. A stable solution results.

Example 6

The procedure of Example 5 is repeated, replacing the ethyleneglycol acetate with the corresponding dipropionate. A stable solution results.

Example 7

The procedure of Example 5 is repeated, replacing the ethylene glycol diacetate with an equal amount of butylene glycol diacetate. A stable solution results.

Example 8

The stability of the solutions of the present invention were tested against other typical organic solvents in two ways. First, by an accelerated test, autoclaving at 121° C., and secondly, at a lower temperature for a longer period of storage. In every case the antibiotic was tetracycline and the concentration 50 mg./ml. Table 1 shows the stability after autoclaving.

TABLE 1—AUTOCLAVE STABILITY OF NEUTRAL TETRACYCLINE (50 MG./ML. AS TC.HCl) IN VARIOUS SOLVENTS AT 121° C.

| Solvent | Microbiological activity (percent of theory) | | |
|---|---|---|---|
| | 30 min. | 60 min. | 120 min. |
| Diethyl nicotinamide | 66 | 51 | 27 |
| Dimethyl acetamide | 43 | 28 | 20 |
| Dimethyl lactamide | 16 | 17 | 17 |
| 1,3-dioxolane | 46 | 39 | 32 |
| Ethanol (abs.) | 36 | 12 | 2 |
| Isopropylidene glycol | 67 | 58 | 42 |
| Monoacetin | 10 | <10 | <10 |
| Polyethylene glycol 400 | 58 | 37 | <5 |
| Propylene glycol | <5 | <5 | <5 |
| Triacetin | 83 | 82 | 76 |

It will be noted that even at two hours autoclaving the solution of triacetin retained at least two-thirds of its antibiotic activity, whereas the best that any other solvent did, isopropylidene glycol was less than half. It should also be noted that the presence of a hydroxy group as shown by monoacetin completely destroys stability.

Example 9

Tests were made at room temperature and 42° C. for extended periods of time. The results of these tests are shown in Table 2. As in the case of the preceding tests, the solution was of tetracycline in a concentration of 50 mg./ml.

TABLE 2.—STABILITY OF NEUTRAL TETRACYCLINE (50 MG./ML. AS TC. HCl) IN VARIOUS SOLVENTS AT LOW TEMPERATURES

| Solvent | Initial | Microbiological Activity (Percent of Theory) | | | | |
|---|---|---|---|---|---|---|
| | | 42° C., 2 mon. | Room Temperature | | | |
| | | | 2 mon. | 4 mon. | 6 mon. | 1 year |
| Diethyl nicotinamide | 82 | 26 | 74 | <16 | | |
| Isopropylidene glycol | 71 | 32 | 66 | | | 46 |
| Triacetin | 94 | 82 | 91 | 87 | 85 | 79 |

It will be noted that even at a shorter total length of time diethyl nicotinamide and isopropylidene glycol showed marked losses of activity as compared to the solution of triacetin.

Example 10

Tests were also made using other neutral tetracycline antibiotics in the solvent of the present invention. The results of this stability at room temperature for extended periods of storage are shown in Table 3.

TABLE 3.—STABLE SOLUTONS OF OTHER NEUTRAL TETRACYCLINE ANTIBIOTICS AT THERAPEUTIC LEVELS

| System | Conven., mg./ml. | Microbiological Activity, Percent of Theory (room temperature) | |
|---|---|---|---|
| | | 2 mon. | 1 year |
| CTC/Triacetin | 25 | 98 | |
| OTC/Triacetin | 10 | 98 | 86 |
| DMCTC/Triacetin | 10 | 101 | |
| DMTC/Triacetin | 25 | 98 | 90 |

CTC—Chlortetracycline.
OTC—Oxytetracycine.
DMCTC—Demethylchlortetracycline.
DMTC—Demethyltetracycline.

Table 3 shows that many other neutral tetracycline antibiotics also retain their potency and physical stability in triacetin.

The stability of the compositions of the present invention is markedly decreased by the presence of such materials as water, bases, for example, triethanolamine, acids such as ascorbic acid, lactic acid, acetic acid, sulfuric acid, etc. Also certain solid adjuvants such as nicotinamide, isosorbide itself, caprolactam, should not be present. It should be noted that while the presence of water decreases the stability on long standing this does not mean that the products of the present invention may not be used when diluted with water. In fact this is often done but once diluted they will not retain their long-term stability. In addition to the excellent physical and chemical stability of the solutions in triacetin and the like, the ready dilution with water exhibited by these products is an advantage for many uses.

We claim:

1. Stable solutions of neutral tetracycline antibiotics in triacetin.

2. Solutions according to claim 1 in which the tetracycline antibiotic is tetracycline.

3. Solutions according to claim 1 in which the antibiotic is oxytetracycline.

4. Solutions according to claim 1 in which the antibiotic is demethyltetracycline.

5. Solutions according to claim 1 in which the antibiotic is demethylchlortetracycline.

6. Solutions according to claim 1 in which the antibiotic is chlortetracycline.

No references cited.

NICHOLAS S. RIZZO, Primary Examiner.